US006825574B1

(12) United States Patent
Mooring (10) Patent No.: US 6,825,574 B1
(45) Date of Patent: Nov. 30, 2004

(54) SPRING MOTOR POWERED ELECTRICITY GENERATION SYSTEM ACTUATED BY RECIPROCATING NATURAL FORCES

(76) Inventor: Jon Mooring, 9944 Bon Vue Dr., El Cajon, CA (US) 92021

( * ) Notice: Subject to any disclaimer, the term of this patent is extended or adjusted under 35 U.S.C. 154(b) by 105 days.

(21) Appl. No.: 10/244,169

(22) Filed: Sep. 13, 2002

(51) Int. Cl.$^7$ ............................................. H02P 9/04
(52) U.S. Cl. ..................................................... 290/1 R
(58) Field of Search ........................................ 290/1 R (56) References Cited

U.S. PATENT DOCUMENTS

| | | | | |
|---|---|---|---|---|
| 3,636,790 A | * | 1/1972 | Bertrang et al. ............... | 74/409 |
| 3,701,523 A | * | 10/1972 | Erickson ....................... | 493/23 |
| 3,760,905 A | * | 9/1973 | Dower ........................... | 185/2 |
| 3,802,181 A | * | 4/1974 | Marquis ....................... | 368/134 |
| 4,020,923 A | * | 5/1977 | Taylor ........................... | 185/11 |
| 4,211,401 A | * | 7/1980 | Cunard ......................... | 472/119 |
| 4,228,360 A | * | 10/1980 | Navarro ........................ | 290/43 |
| 4,273,455 A | * | 6/1981 | Gubelmann et al. .......... | 400/309 |
| 4,352,023 A | * | 9/1982 | Sachs et al. .................. | 290/42 |
| 4,480,966 A | * | 11/1984 | Smith ........................... | 417/332 |
| 4,491,317 A | * | 1/1985 | Bansal ......................... | 472/119 |
| 4,500,827 A | * | 2/1985 | Merritt et al. ................. | 322/3 |
| 4,610,140 A | * | 9/1986 | Thompson, Jr. .............. | 60/506 |
| 4,612,768 A | * | 9/1986 | Thompson, Jr. .............. | 60/506 |
| 4,785,678 A | * | 11/1988 | McGugan et al. ............. | 74/42 |
| 5,378,196 A | * | 1/1995 | Pinch et al. .................. | 472/119 |
| 5,552,657 A | * | 9/1996 | Epstein et al. ................ | 310/339 |
| 5,833,545 A | * | 11/1998 | Pinch et al. .................. | 472/119 |
| 5,836,855 A | * | 11/1998 | Eschenbach .................. | 482/57 |
| 5,880,532 A | * | 3/1999 | Stopher ........................ | 290/1 E |
| 5,909,784 A | * | 6/1999 | Best ............................. | 185/10 |
| 6,017,295 A | * | 1/2000 | Eschenbach .................. | 482/57 |
| 6,199,664 B1 | * | 3/2001 | Tkaczyk et al. .............. | 185/39 |
| 6,249,100 B1 | * | 6/2001 | Lange ........................... | 318/471 |
| 6,588,918 B1 | * | 7/2003 | Millar ........................... | 362/192 |
| 6,744,145 B2 | * | 6/2004 | Chang ........................... | 290/1 R |

FOREIGN PATENT DOCUMENTS

| | | | | |
|---|---|---|---|---|
| DE | 19924506 A1 | * | 11/2000 | ............. F03D/5/00 |
| GB | 2052881 A | * | 1/1981 | ............. H02K/7/00 |
| JP | 05064418 A | * | 3/1993 | .......... H02K/57/00 |

* cited by examiner

Primary Examiner—Nicholas Ponomarenko
Assistant Examiner—Pedro J. Cuevas
(74) Attorney, Agent, or Firm—Charles C. Logan, II (57) ABSTRACT

An electricity generation system that has the ability to generate clean electrical power by mechanically capturing the tremendous power of large trees as they sway in the wind. The system utilizes a modular unit that is mounted on a frame assembly covered by a housing. A plurality of spring motors are mounted in a spring motor housing that is journaled on an elongated spring-motor secondary winding axle. The inner end of each spring motor metal band is secured to the spring-motor secondary winding axle. The spring motor housing is releasably connected to a stationary retention plate to prevent rotation of the spring motor housing until the spring motors are wound a sufficient amount. A cable tether member has one end attached a tree trunk adjacent its upper area and the other end of the tether line is secured to the front end of a ratcheting arm. When the wind force bends the tree from it static upright position, the ratcheting arm is pulled downwardly causing a winding drive spur gear to rotate causing the spring motors to be wound incrementally each time the wind blows the tree from it static upright position. An electricity generator is mounted on the frame assembly and there is rotation transmission structure connected to the power generation drive shaft of the electricity generator. When the spring motor assembly has been sufficiently wound, a timing gear assembly releases the motor spring housing assembly allowing it to rotate freely to dissipate its stored energy and drive the electricity generator. This cycle is repeated throughout the day to generate electricity when the wind is blowing. A modified electricity generation system utilizes the wave motion of a natural body of water by tethering the ratchet arm to a floating buoy.

28 Claims, 12 Drawing Sheets

SPRING MOTOR POWERED ELECTRICITY GENERATION SYSTEM ACTUATED BY RECIPROCATING NATURAL FORCES

BACKGROUND OF THE INVENTION

The invention relates to an electricity generation system and more specifically to one that is powered by natural forces.

The present two major forms of electricity generation utilize water power that turns electricity producing turbines and fossil fuels that power electric power plants. Currently, fewer dams are being built for the purpose of generating hydroelectric power. The fossil fuel electric power plants continue to consume a large amount of the worlds non-replenishable resources of oil and coal. Attempts have been made to use solar energy and wind power to produce electricity from their unlimited source of natural power. Most of these systems are costly when compared to the cost of electricity produced by fossil fuels. There exists other natural forces which have not been utilized for generating electricity that need to be investigated. One of these is the force of the wind that causes a tree to bend repeatedly as the wind periodically blows. Another large untapped natural source of power are the waves of a large body of water.

It is an object of the invention to provide a novel electricity generation system that can be powered by the force of the wind blowing against a tree and causing it to bend repeatedly through a range of useful degrees.

It is also an object of the invention to provide a novel electricity generation system that can be powered by the force of waves flowing toward the shore.

It is another object of the invention to provide a novel electricity generation system that will be effective to protect a tree from excessive windthrow or toppling in high winds.

It is a further object of the invention to provide a novel electricity generation system that can be used to generate tremendous amounts of clean electrical power at a moderate cost.

It is also an object of the invention to provide a novel electricity generation system that utilizes spring motors that are rewound by using the force of the wind or waves of a natural body of water.

It is another object of the invention to provide a novel electricity generation system that is economical to manufacture and market.

SUMMARY OF THE INVENTION

The natural forces powered electricity generation system utilizes an electricity generation module having an elongated ratcheting arm extending laterally therefrom. A cable tether member has its remote end attached to the main trunk of a tree at a point approximately ⅔ of the tree's height. The other end of the cable tether member is attached adjacent the front free end of the ratcheting arm. As the wind repeatedly blows against the tree causing it to bend rearwardly, the ratcheting arm produces a counter clockwise rotation (in the particular orientation illustrated in the drawings) of the spring-motor primary winding axle. This action is produced by a winding-drive spur gear that is rigidly mounted on the spring-motor primary winding axle. A winding-drive gear ratchet pawl rotates the winding-drive spur gear counter clockwise a predetermined amount each time the wind blows hard enough to bend the tree rearwardly a predetermined amount. When the wind subsides, a winding-drive gear stop ratchet pawl prevents the winding-drive spur gear from rotating rearwardly. A pair of tension springs then return the ratchet arm to its original static position. The example of the winding-drive spur gear described in the Description of the Preferred Embodiment has 160 gear teeth grooves that the winding-drive gear ratchet pawl can interlock with as it is ratcheted in response to the rearward and return travel of the ratcheting arm caused by the wind intermittently bending the tree trunk.

The front end of the spring-motor primary winding axle is connected to a one-way sprague coupling that in turn is connected to the front end of the spring-motor secondary winding axle. The purpose of the one-way sprague coupling is to allow the spring-motor secondary winding axle to spin freely once the spring motors have released their energy. The spring-motor primary winding axle does not spin during the electricity generation cycle of the spring motor drum assembly because of the one-way sprague coupling. A spring drum assembly is journaled on the spring-motor secondary winding axle. A plurality of spring motor assemblies are positioned within the spring motor drum assembly and each has a spring motor having a spring metal band whose inner end is captured by structure attached to the outer periphery of the spring-motor secondary winding axle. In the Description of the Preferred Embodiment, the ratcheting action of the ratcheting arm will rotate the winding-dive spur gear 360 degrees causing the spring-motor primary winding axle and the spring-motor secondary winding axle to rotate counter clockwise twenty times and wind the respective spring motors to approximately 95% of their power range. While the spring motors are being wound, the spring motor drum assembly is prevented from rotating because the centrifical activated swivel arm next to its front end is captured against a pair of shoulders on the stationary retention plate. A timing gear assembly counts the number of rotations of the spring-motor primary winding axle. It has been designed to revolve its timing gear cam 360 degrees when the spring-motor primary winding axle is rotated twenty times. When the timing gear cam has completed its 360 degree travel, it will kick the centrifical activated swivel arm upwardly, releasing the spring motor drum assembly to rotate in a counter clockwise direction and dissipate its stored energy.

A generator drive pulley is mounted on the rear end of the spring drum assembly and it aligns with a pulley mounted on the power generation driveshaft of a generator mounted on the frame assembly of the electricity generation module. The stored energy in the spring motors will drive a belt passing around the respective pulleys causing the generator to produce intermittent bursts of clean A/C power that can either be utilized or fed into an existing power grid. The flywheels in the spring motor drum assembly will cause it to continue to rotate for a period after the power in the spring motors has dissipated. During this rotation, the centrifical activated swivel arm will remain radially extended until the spring motor drum assembly comes to a stop. At that time it will automatically drop downwardly and be captured by the shoulders on the stationary retention plate and the cycle begins again.

The electricity generation module can also be utilized to produce electricity using the force of waves of water as they travel toward the shore. In this embodiment, a cable tether member would have its one end connected to a buoy floating on the surface of the water. Its other end would be connected to the front portion of the ratcheting arm. The same type of ratcheting action would take place to wind the spring motors in the spring-motor drum assembly until the predetermined number of rotations have been made. At this point it will function in the same manner as that previously described above.

DESCRIPTION OF THE PREFERRED EMBODIMENT

Figure 1:
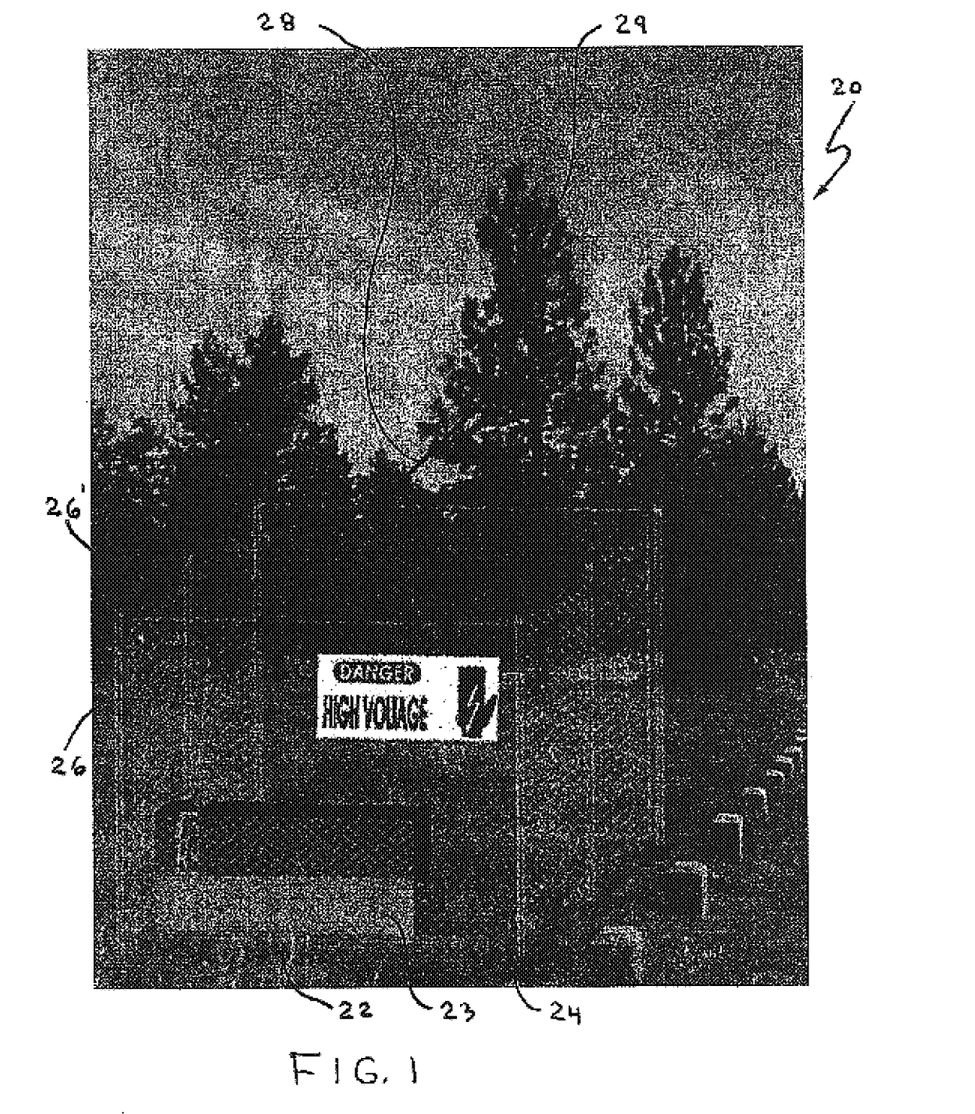
FIG. 1 is a pictorial depiction of an embodiment of the natural forces powered electricity generation system tethered to the trunk of a tree.

A first embodiment of the natural forces powered electricity generation system will now be described by referring to FIGS. 1–13 of the drawings. The natural forces powered electricity generation system is generally designated numeral 20. As seen in FIG. 1, it has a electricity generation modular unit 22 having a housing 23 and it is mounted on a concrete pad 24. A ratcheting arm 26 extends outwardly from a cutout section in the top of housing 23. A numeral 26' depicts the ratcheting arm 26 in its stationary resting position. A cable tether member 28 has its front end secured to the front area of ratcheting arm 26 and its rear end is attached to a tree 29.

Figure 2:
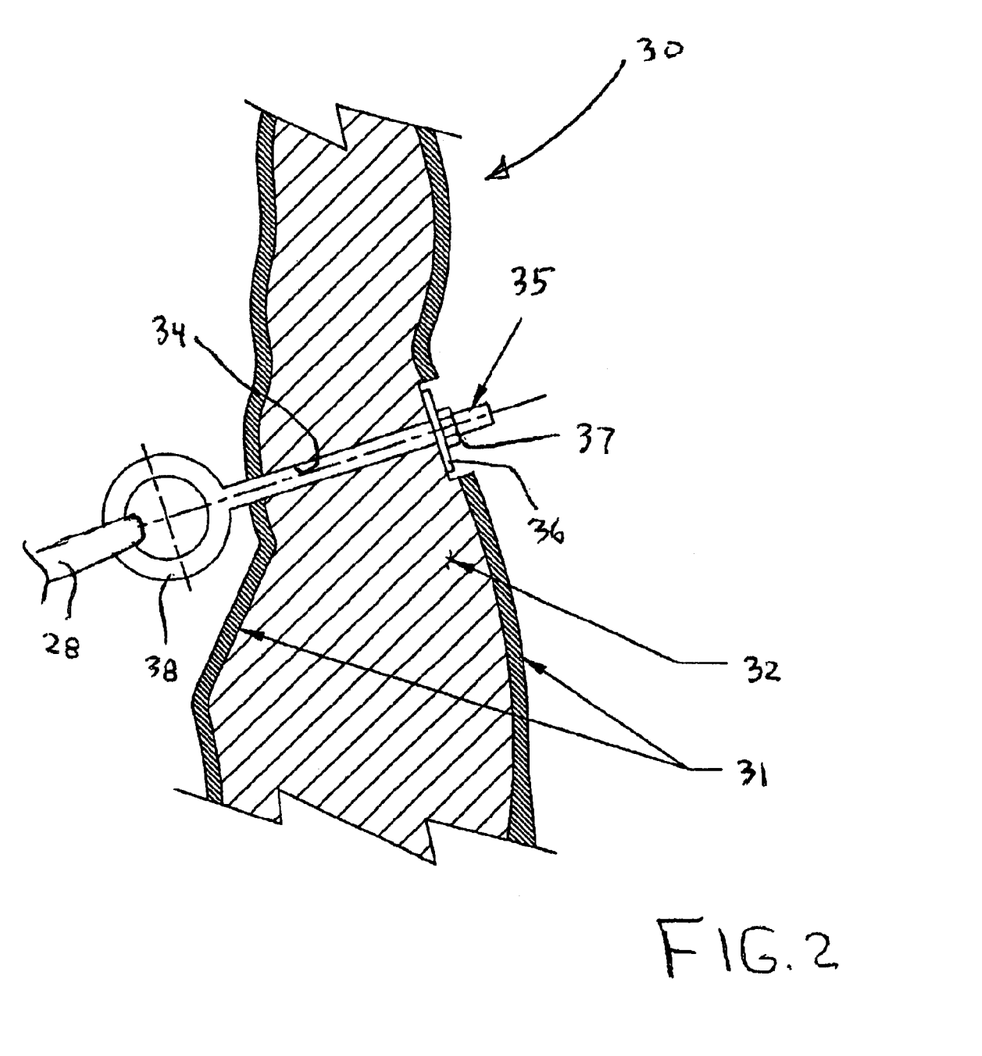
FIG. 2 is a vertical cross section showing the manner in which the cable tether member of FIG. 1 would be attached to the trunk of a tree.
Figure 3:
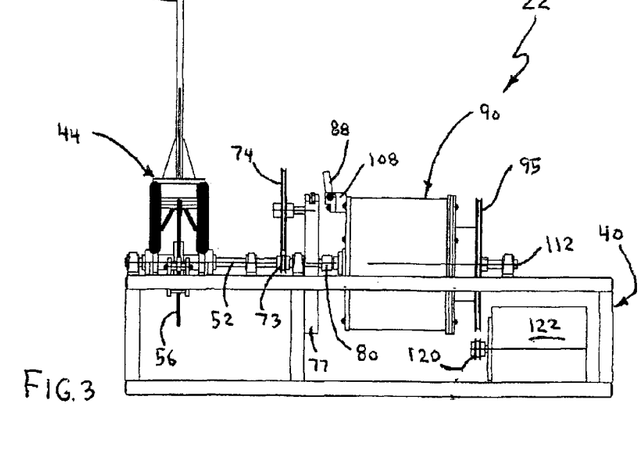
FIG. 3 is a schematic front elevation view of the electricity generation module with its housing removed.

FIG. 2 is a vertical cross section of tree 29 illustrating the manner in which cable tether member 28 is secured thereto. Tree 29 has a trunk 30 having a cambium outer layer 31 and an inner hardwood center 32. A bore hole 34 passes through tree trunk 30 at a predetermined angle to substantially align with the longitudinal axis of ratcheting arm 26. An eyebolt 35 is inserted through bore hole 34 and secured in position by a washer 36 and a nut 37. Eyebolt 35 has a ring portion 38 to which the front end of cable tether member 28 is secured.

Electricity generation module 22 is illustrated in FIGS. 3–12 with its housing 23 removed. These Figures show that the components of the electricity generation module 22 are mounted on a frame assembly 40 that has been built with tubular beam members, corner posts, brace members and a central post member.

Figure 6:
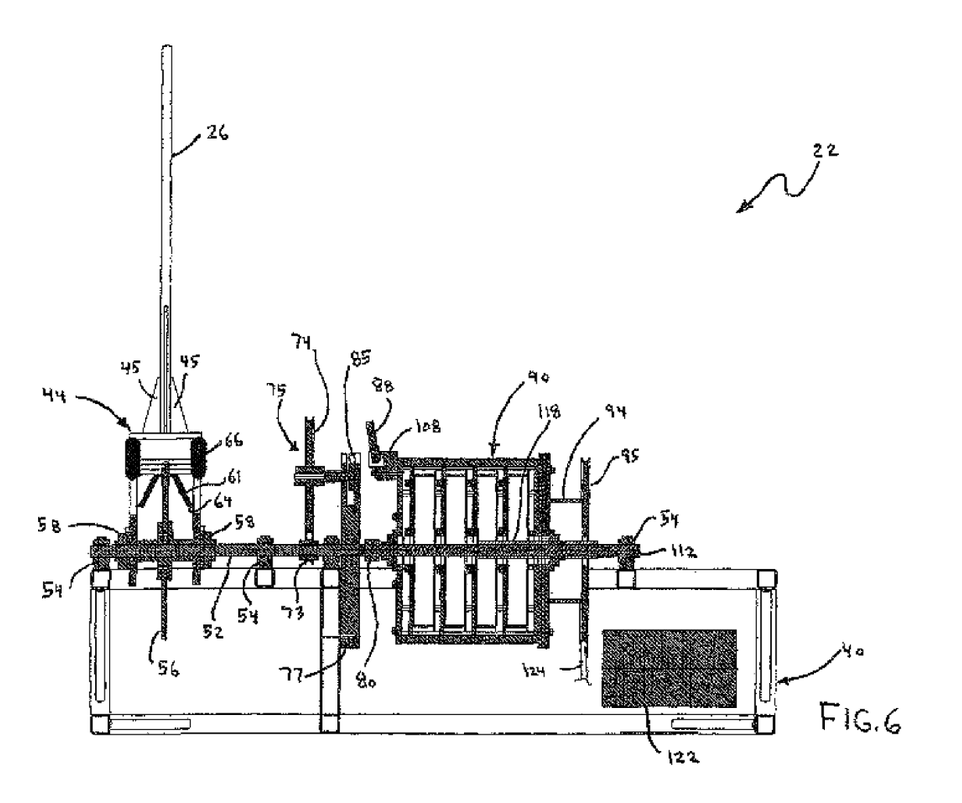
FIG. 6 is a schematic cross sectional view taken along lines A—A of FIG. 4.
Figure 7:
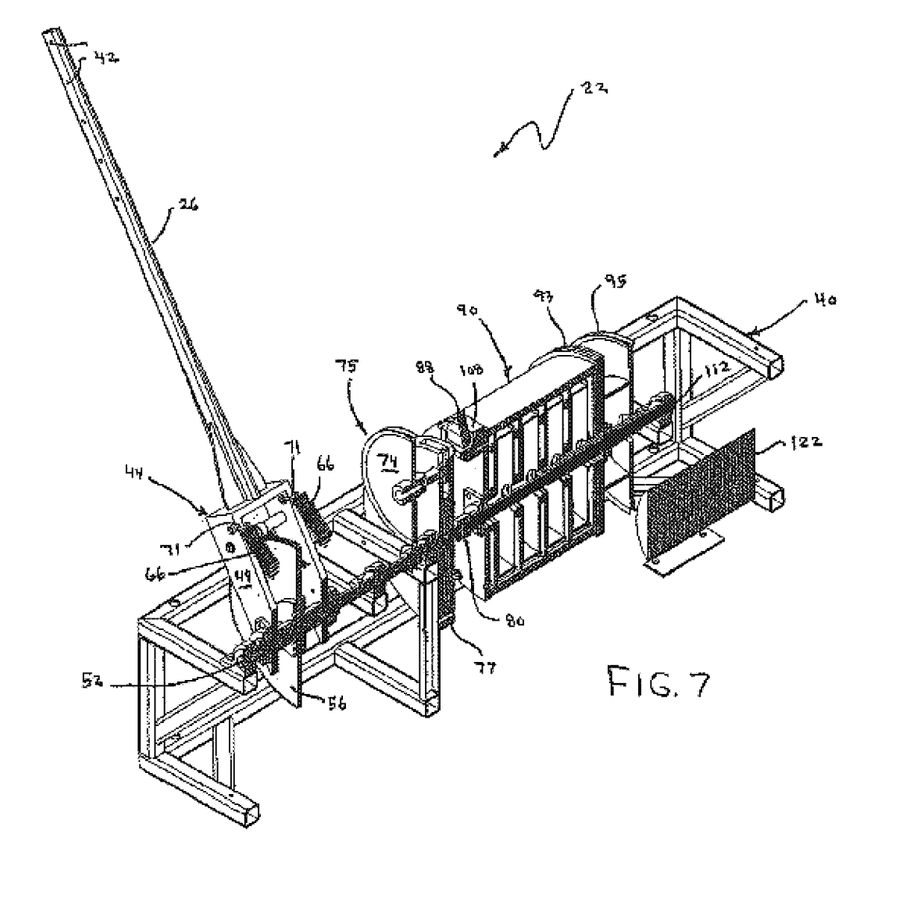
FIG. 7 is a schematic front perspective view taken along lines A—A of FIG. 4.
Figure 8:
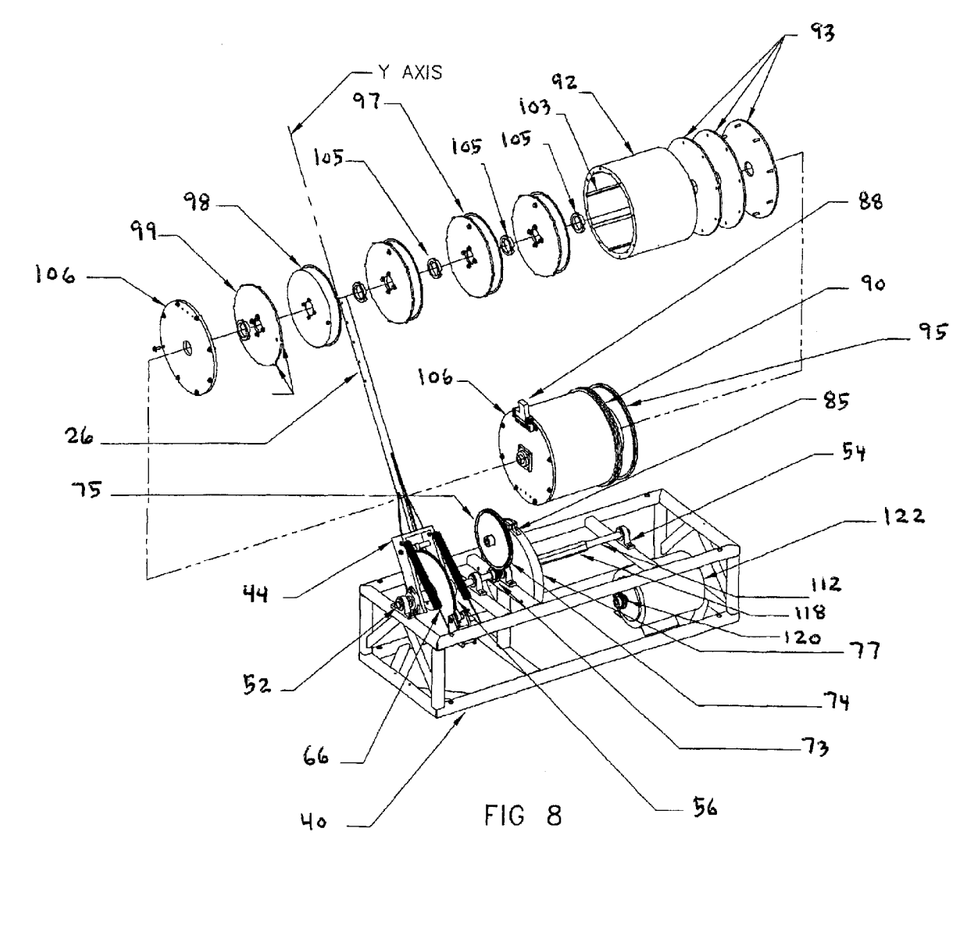
FIG. 8 is a schematic front perspective view of the electricity generation module with its housing removed showing the spring motor drum assembly in an exploded view.
Figure 9:
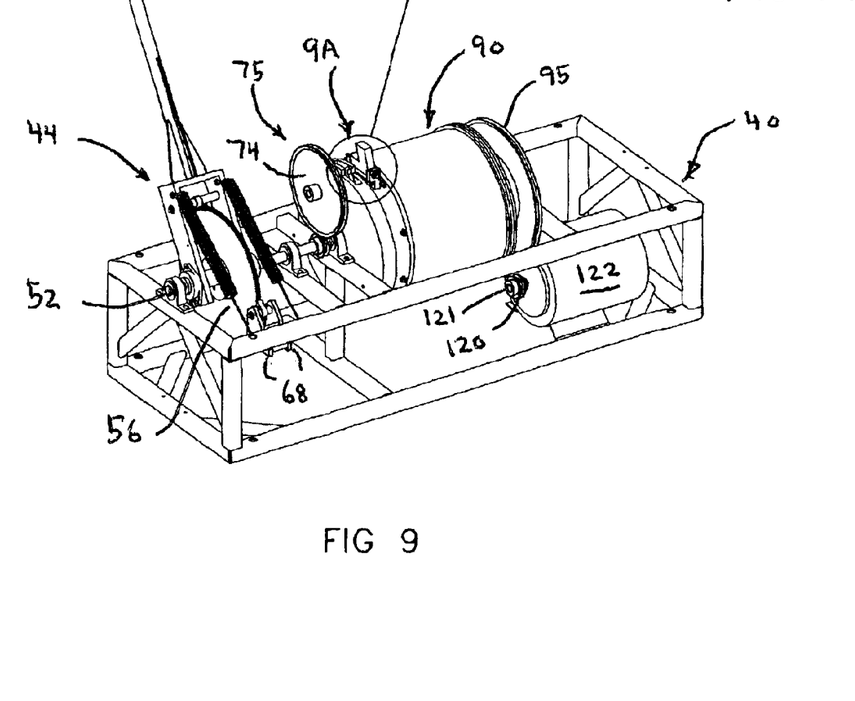
FIG. 9 is a schematic front elevation view of the electricity generation module with its housing removed.
Figure 9A:
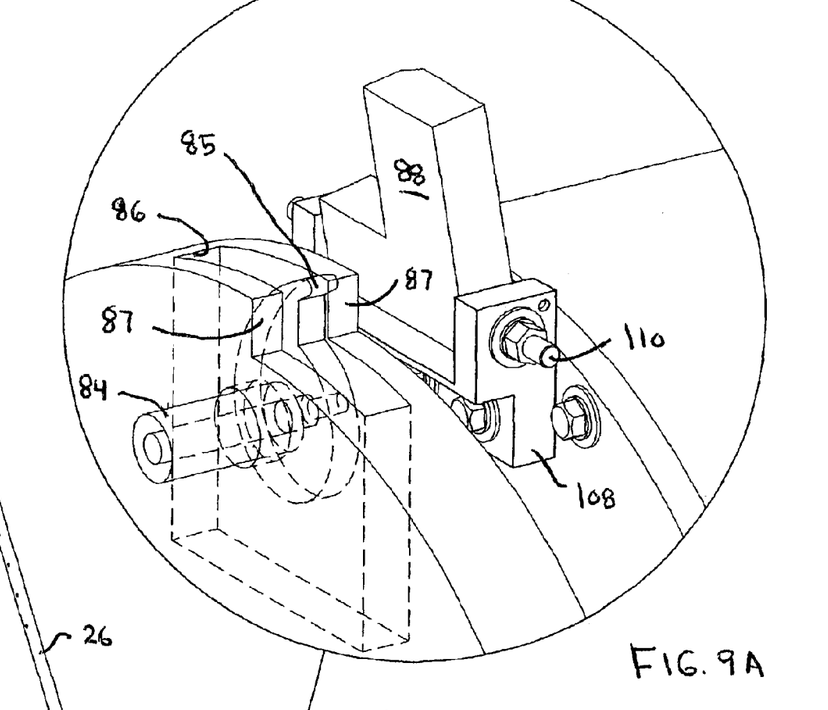
FIG. 9A is an enlarged front perspective view taken along the circular line 9A of FIG. 9.

Referring to FIGS. 6–8, the working parts of the electricity generation module will be described along with the manner in which they function. Ratcheting arm 26 has a plurality of apertures 42 thereby allowing cable tether member 28 to be attached at various points or positions. The rear end of ratcheting arm 26 is welded to ratchet arm mounting assembly 44 and is given structural integrity by the welded gussets 45. Ratchet arm mounting assembly 44 has a pull arm yoke having a cross member 48 and a pair of laterally spaced arms 49 and 50. A spring-motor primary winding axle 52 has various points in its length journaled in pillow block bearings 54. A winding-drive spur gear 56 is rigidly secured to spring-motor primary winding axle 52 so that they rotate as a single unit. Winding-drive spur gear 56 has 160 gear teeth. The bottom end of arms 49 and 50 have apertures therein through which spring-motor primary winding axle 52 freely passes. Bearings 58 are attached to the outer surfaces of the respective arms 49 and 50 and aid in journaling ratchet arm mounting assembly 44 on spring-motor primary winding axle 52.

Figure 4:
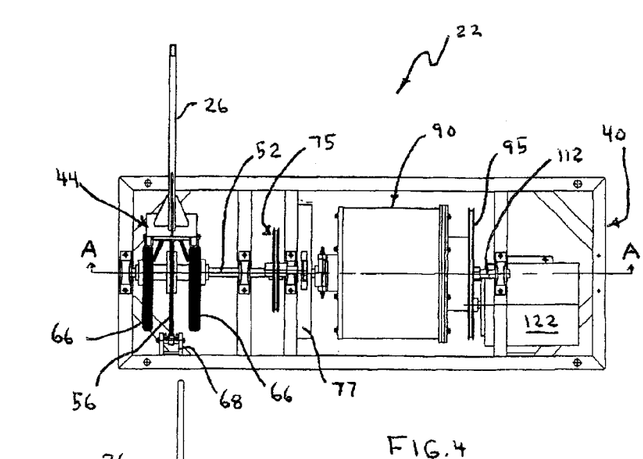
FIG. 4 is a schematic top plan view of the electricity generation module with its housing removed.
Figure 5:
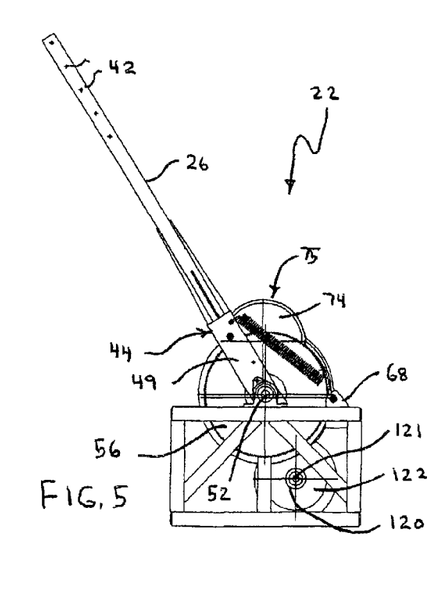
FIG. 5 is a schematic left side elevation view of the electricity generation module with its housing removed.
Figures 10, 10A:
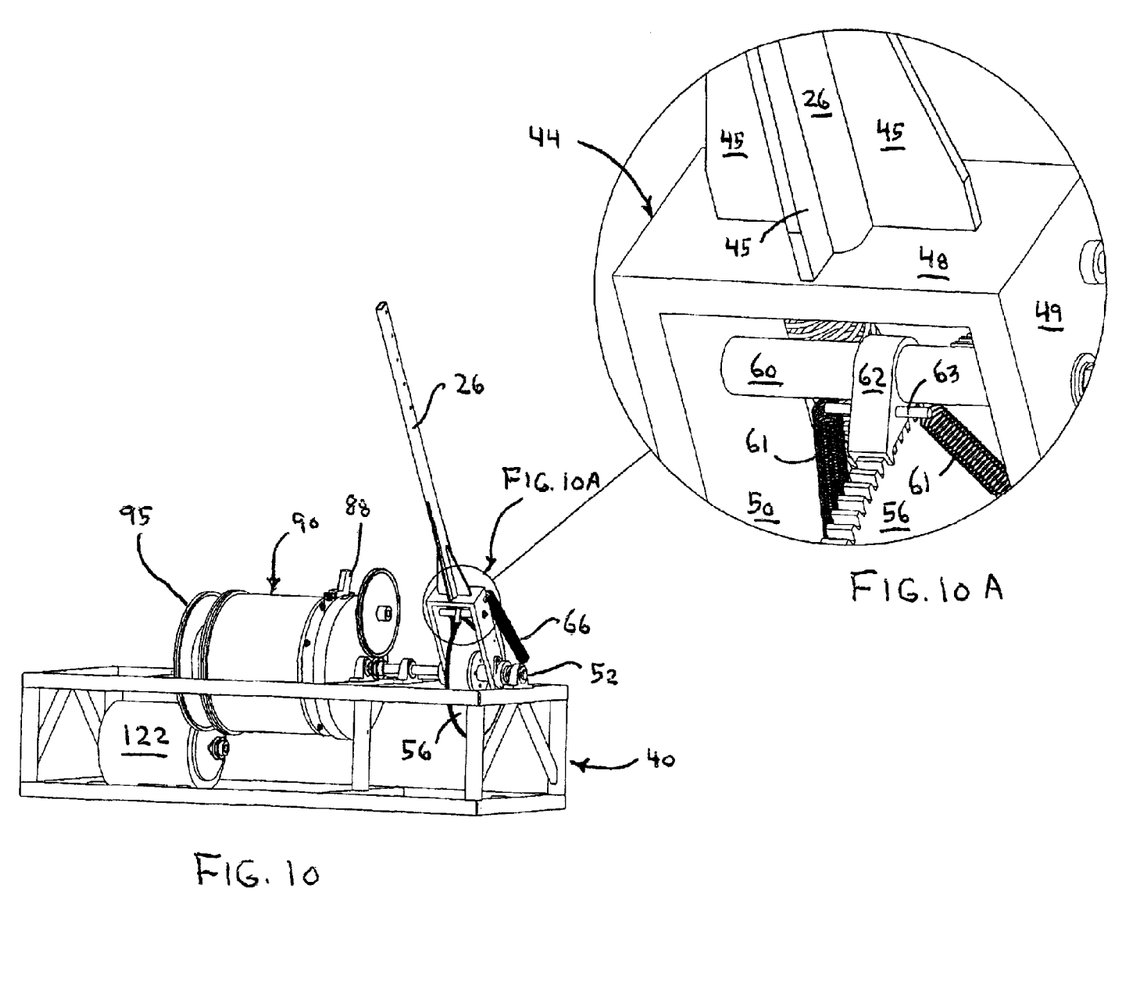
FIG. 10 is a schematic rear perspective view of the electricity generation module with its housing removed.
FIG. 10A is an enlarged rear perspective view taken along the circular line 10A of FIG. 10.
Figures 11, 11A:
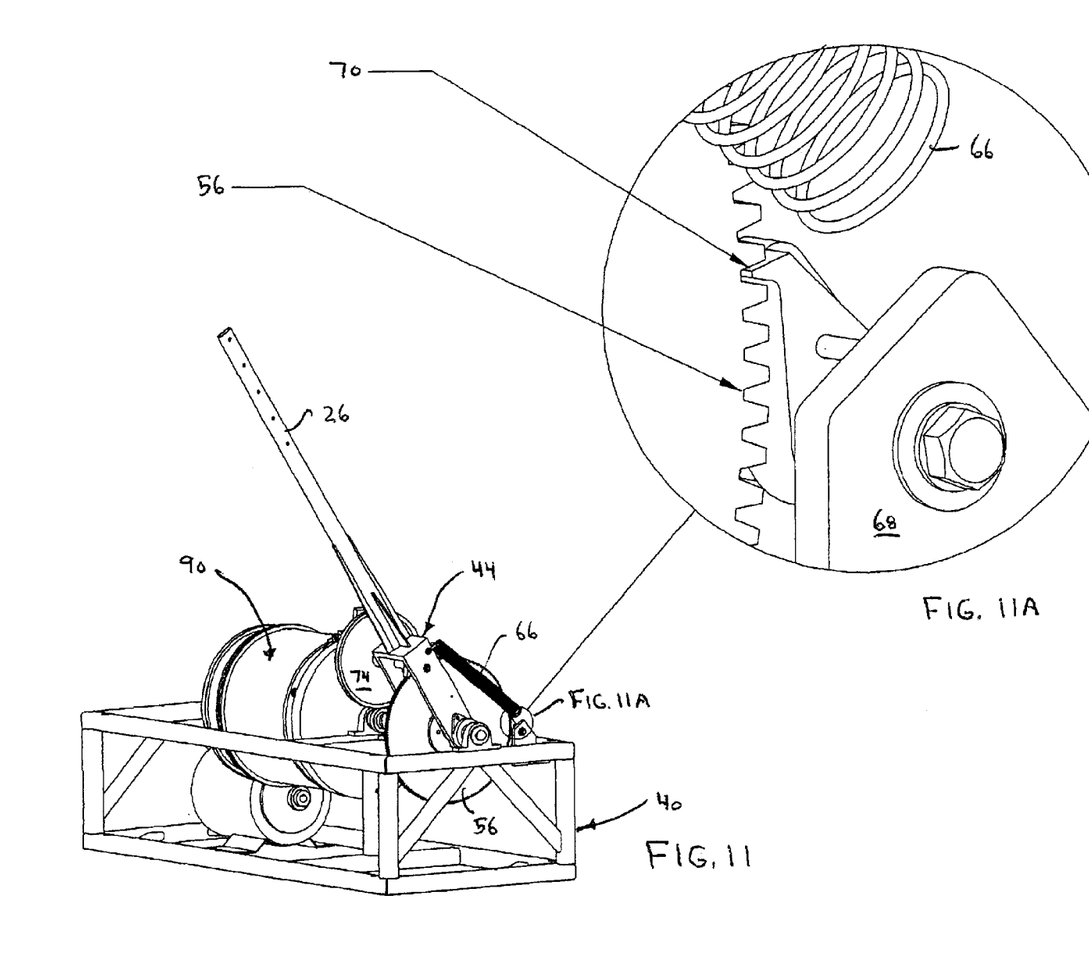
FIG. 11 is a schematic rear perspective view of the electricity generation module with its housing removed.
FIG. 11A is an enlarged rear perspective view taken along the circular line 11A of FIG. 11.
Figure 12:
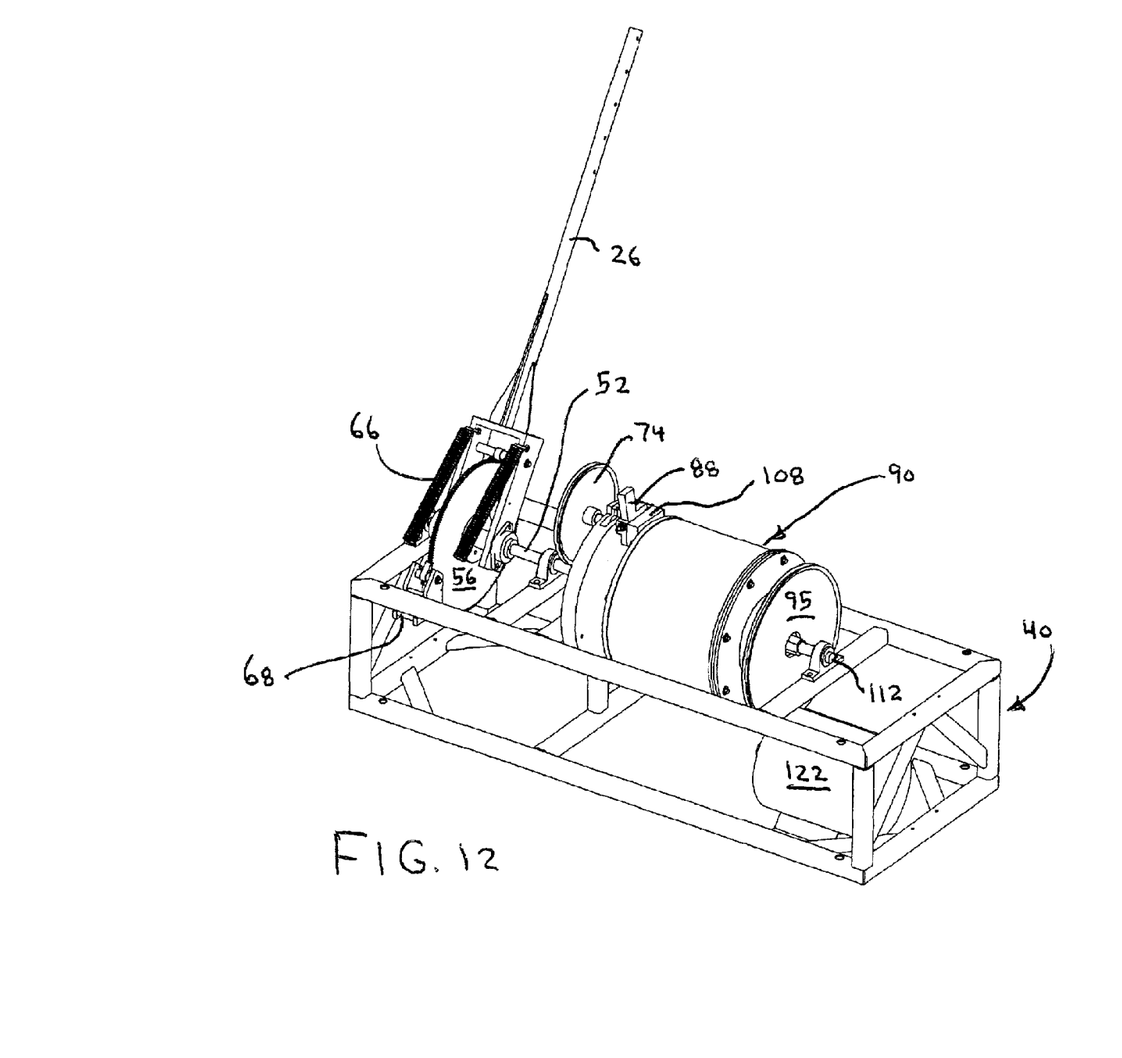
FIG. 12 is a schematic front perspective view of the electricity generation module with its housing removed.

Referring to FIGS. 10 and 11A, the operation of ratchet arm 26 will be described. A shaft 60 has its opposite ends rigidly secured to arms 49 and 50. A winding-drive gear ratchet pawl 62 is journaled on shaft 60. Tension springs 61 have their front ends captured by spring attachment pins 63 and their rear ends captured by spring attachment pins 64 (see FIG. 6). These tension springs function to keep winding-gear ratchet gear pawl 62 secured to one of the gear teeth of winding-drive spur gear 56. When the wind pulls ratcheting arm 26 rearwardly, winding-drive spur gear 56 will be rotated counter clockwise and spring-motor primary winding axle 52 be rotated counter clockwise. The amount of rotation of winding-drive spur gear 56 will be determined by the strength of the wind forcing tree 29 to bend rearwardly. When the bending force of the wind subsides, tension springs 66 will pull ratcheting arm 26 forwardly toward its original static position and winding-drive gear ratchet pawl 62 will be lifted up out of its gear tooth slot and travel to the next gear tooth slot or the one thereafter depending upon the initial force of the wind on tree 29. At the finish of ratcheting arm 26 returning forwardly, winding-drive gear ratchet pawl 62 will drop into an aligned gear tooth slot. As seen in FIGS. 4, 11 and 11A, brackets 68 support a winding-drive gear stop ratchet pawl 70 that is journaled on a shaft extending between the respective brackets 68. As ratcheting arm 26 rotates counter clockwise, winding-drive spur gear 56 will be forced to rotate counter clockwise also and winding drive gear stop ratchet pawl 70 will ride upwardly out of its gear tooth groove and pass to the next one or two gear tooth grooves depending upon the force of the wind. During this time ratcheting arm return tension springs 66 are stretched until the wind subsides and then they pull ratcheting arm 26 forwardly. The rear end of tension springs 66 are secured to spring attachment brackets 71 on the respective arms 49 and 50. The front ends of tension springs 66 are connected to brackets 68.

Traveling along the length of spring-motor primary winding axle 52, it will be seen in FIG. 6 that there is a timing gear drive pulley 73 rigidly mounted thereon. It aligns with a timing actuator gear pulley 74 that is part of timing gear assembly 75. Rotation of timing actuator gear 74 is accomplished by a closed loop belt (not shown) that passes around the respective pulleys. Spring-motor primary winding axle 52 then passes through stationary retention plate 77 that has a bushing 78 in its bore hole. The right end of spring-motor primary winding axle 52 is rigidly connected to a one-way sprague coupling 80. The purpose of the one-way sprague coupling is to allow the spring-motor secondary winding axle to spin freely once the spring motors have released their energy. The spring-motor primary winding axle does not spin during the electricity generation cycle of the spring motor drum assembly because of the one-way sprague coupling. For every revolution of spring-motor primary winding axle 52 and timing gear drive pulley 73, timing actuator gear 74 will rotate ¹⁄₂₀ of a revolution. Timing actuator gear 74 has a bore hole 81 in its hub 82 that receives a shaft 84 whose opposite end is rigidly secured to a timing gear cam 85. Timing gear cam 85 is mounted in a slot 86 in the top end of stationary retention plate 77. A pair of shoulders 87 (see FIG. 9A) normally capture the centrifical activated swivel arm 88. This prevents rotation of spring motor drum assembly 90 and this will be described later. Timing gear cam 85 rotates through its full cycle each time spring-motor primary winding axle 52 rotates twenty times while winding each of the spring motors to be described later.

The structure of spring motor drum assembly 90 will now be discussed by referring to FIGS. 6–8. Its major component is spring motor housing 92 that has an open left end and a closed right end. A plurality of flywheels 93 are secured to the closed right end. A cylindrical drum 94 is secured to the outer most flywheel 93 and it supports a generator drive pulley 95. A plurality of spring motor assemblies 97 each have a spring motor 98 therein with a backing plate 99 secured to its left side. Backing plates 99 have a plurality of protrubances 101 extending radially outwardly around their perimeter and these are slid into aligned grooves 103 in the interior of spring motor housing 92. This prevents the spring motor assemblies from rotating within spring motor housing 92 while spring motors 98 are being wound. A spacer 105 is located between each of the spring motor assemblies 97. A housing cover plate 106 closes the left end of spring motor housing 92. A bracket assembly 108 is mounted on housing cover plate 106 and centrifical activated swivel arm 88 is journaled on shaft 110 so that it may freely travel from a horizontal position to a slightly less than vertical position that insures that it will drop to the horizontal position when spring motor drum assembly 90 stops free wheeling once it has been released. The respective housing cover plate 106, backing plates 99, spring motors 98, spacers 105, flywheels 93 and pulley 95 have a central aperture whose diameter is greater than that of the spring-motor secondary winding axle 112 that extends through spring motor drum assembly 90 and out its opposite ends. The front end of spring-motor secondary winding axle 112 is connected to one-way sprague coupling 80 that is secured to the rear end of spring-motor primary winding axle 52 so that counter clockwise rotation of spring-motor primary winding axle 52 will cause spring-motor secondary winding axle 112 to also rotate counter clockwise and wind the spring motors 98. The front and rear end of spring motor drum assembly 90 has a bearing 114 secured to them and these bearings are journaled on spring-motor secondary winding axle 112.

Figure 13:
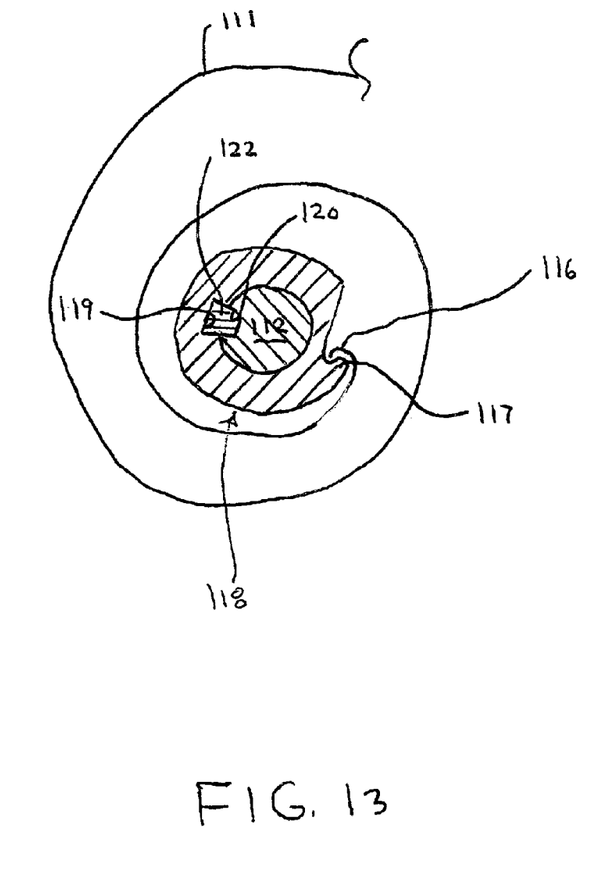
FIG. 13 is a transverse cross sectional view illustrating the manner in which the metal band of the individual spring motors is rigidly captured by the spring-motor secondary winding axle.

The manner in which the individual spring motors 98 are wound to load them is best understood by referring to FIG. 13. Each spring motor 98 has a spring metal band 111 having hook portion 116 formed on its inner end. Hook portion 116 is captured by a finger 117 on tubular adapter 118. Tubular adapter 118 has a keyway 119 formed on its inner surface that aligns with the keyway 120 on the outer surface of spring-motor secondary winding axle 112. A key 122 locks the respective members together so that as spring-motor secondary winding axle is rotated counter clockwise, it will cause the spring metal band 111 of the respective spring motors 98 to be tightly wound while centrifical activated swivel arm 88 is captured by shoulders 87 on the stationary retention plate 77.

In operation, twenty rotations of spring-motor primary winding axle 52 will cause spring-motor secondary winding axle 112 to rotate counter clockwise twenty times and wind the spring motors 98 to approximately 95% of their power. By not winding the springs to their ultimate limit, the life of the springs is prolonged. Pulley 95 is aligned with pulley 120 mounted on power generation driveshaft 121 of generator 122. A belt 124 passes around the respective pulleys 95 and 120. When twenty rotations of spring-motor primary winding axle 52 have occurred, timing gear assembly 75 will have its timing gear cam 85 rotated throughout 360 degrees causing the centrifical activated swivel arm 88 to be lifted nearly vertical thereby releasing the spring motor drum assembly 90 to unleash the built up power in its spring motors 98. The flywheels 93 will aid in continuing the rotation of spring motor drum assembly 90 even after the spring motors 98 have completely unwound themselves. At this time spring-motor secondary winding axle 112 will free wheel counter clockwise. The rotational power transmitted from pulley 95 to pulley 120 will cause generator 122 to produce A.C. current until spring drum assembly 90 comes to a stop. The A.C. current generated can either be used at that time or transferred to a grid for use at another location.

Figure 14:
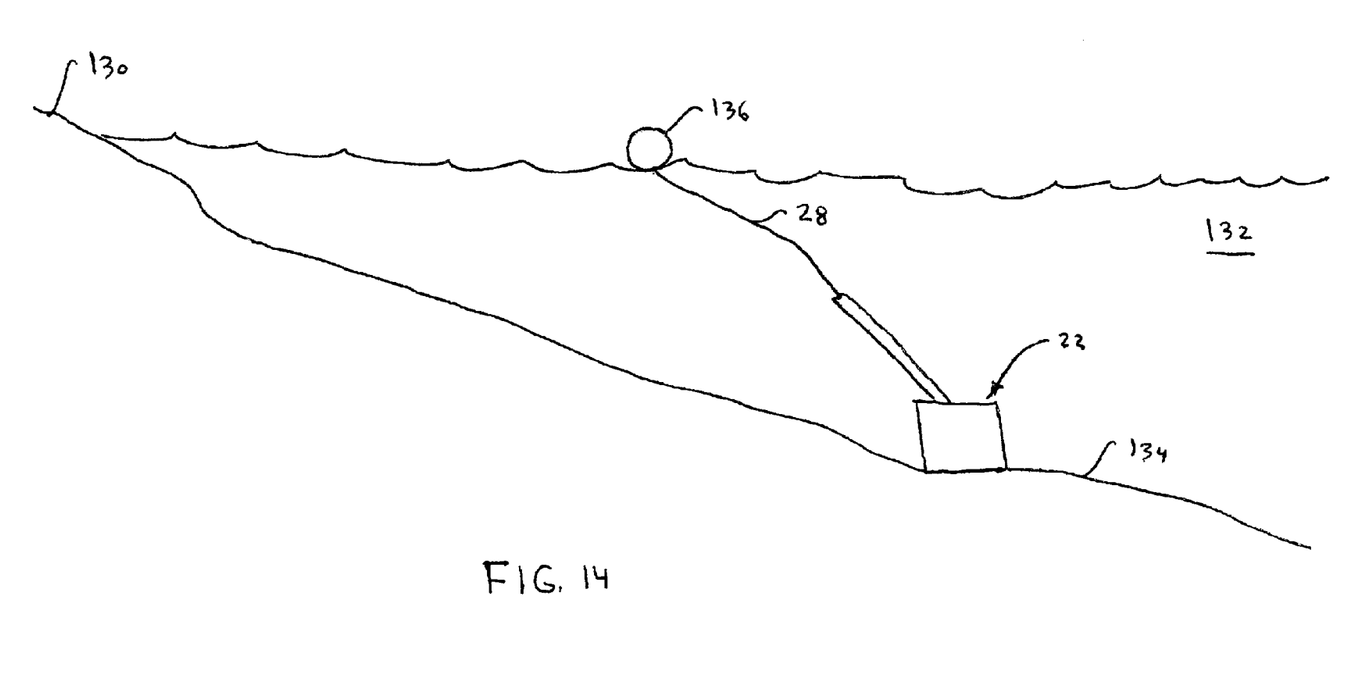
FIG. 14 is a schematic illustration of a first alternative embodiment of the natural forces powered electricity generation system utilizing the wave action of a natural body of water.

An alternative embodiment is illustrated in FIG. 14. A beach 130 on a natural body of water 132 would have an electricity generation module 22 strategically positioned on the sea bottom 134. The cable tether member 28 would have its one end connected to the ratcheting arm 26 and its other end connected to a buoy 136. As the motion of the individual waves drive buoy 136 toward the beach 130, ratcheting arm 26 will be pulled in that same direction until the force of the waves subside. This produces the ratcheting motion that winds the individual spring motors in the same manner as discussed previously. As the waves move away from the beach, the ratcheting arm 26 will be pulled away from the beach also so that the cycle can start over again.

What is claimed is:

1. A spring motor powered electricity generation system actuated by reciprocating natural forces comprising:

a) at least one spring motor connected to an elongated spring motor secondary winding axle having a front end, a rear end and a longitudinally extending X-axis;

b) winding means for winding said at least one spring motor using the reciprocating arcuate rotational motion of a tree that is being intermittently bent from a static position by the force of the wind;

c) an electrical generator having a power generation driveshaft;

d) transmission means for transferring stored energy that is in said at least one spring motor after having been properly wound, to said power generation driveshaft of said electricity generator to produce electrical current; and e) said winding means comprising:
an elongated spring-motor primary winding axle having a front end, a rear end and said same longitudinally extending X-axis; a winding-drive spur gear is rigidly mounted on said spring-motor primary winding axle;
an elongated ratcheting arm having a front end, a rear end and a transversely extending longitudinal Y-axis; said rear end of said ratcheting arm being secured to a ratcheting arm mounting assembly that is journaled on said spring-motor primary winding axle; said ratchet arm mounting assembly having a winding-drive spur ratchet pawl that engages said winding-drive spur gear as it attempts to rotate in one direction and releases from said winding-drive spur gear as it rotates in an opposite direction.

2. A natural forces powered electricity generation system as recited in claim 1 wherein said system is a modular unit.

3. A natural forces powered electricity generation system as recited in claim 2 wherein said modular unit is mounted on a concrete pad.

4. A natural forces powered electricity generation system as recited in claim 1 further comprising a frame assembly and said spring motor, said winding means and said electricity generator are mounted on said frame assembly.

5. A natural forces powered electricity generation system as recited in claim 4 wherein said frame assembly is covered by a housing.

6. A natural forces powered electricity generation system as recited in claim 1 wherein said winding means further comprises first spring means connected to said ratchet arm mounting assembly to return bias said ratchet arm to a static position.

7. A natural forces powered electricity generation system as recited in claim 6 wherein said winding means further comprises an elongated tether member having a front end and a rear end; said rear end being connected to said ratcheting arm adjacent said front end.

8. A natural forces powered electricity generation system as recited in claim 7 wherein said winding means further comprises means on said front end of said tether member for connection to a portion of a tree that is being bent from a static position by the force of the wind.

9. A natural forces powered electricity generation system as recited in claim 1 wherein there are a plurality of spring motors connected to said spring-motor secondary winding axle.

10. A natural forces powered electricity generation system as recited in claim 9 wherein said transmission means comprises at least one flywheel.

11. A natural forces powered electricity generation system as recited in claim 9 wherein said spring motors are located in a spring motor housing.

12. A natural forces powered electricity generation system as recited in claim 1 wherein said winding means further comprises a one-way sprague coupling that is connected to said rear end of said spring-motor primary winding axle to allow said spring motors to be wound in a first direction; said one-way sprague coupling is also connected to said front end of said spring-motor secondary winding axle thereby allowing said spring motor secondary winding axle to rotate freely in said first direction after said at least one spring motor has released said stored energy after having been properly wound.

13. A natural forces powered electricity generation system as recited in claim 1 further comprising counting means for keeping track of the number of times said at least one spring motor is wound a predetermined number of rotations.

14. A natural forces powered electricity generation system as recited in claim 13 further comprising unlatching means for releasing said at least one spring motors, after they have been wound a predetermined number of rotations, so that they can power said electricity generator.

15. A spring motor powered electricity generation system actuated by reciprocating natural forces comprising:
a) at least one spring motor connected to an elongated spring motor secondary winding axle having a front end, a rear end and a longitudinally extending X-axis;
b) winding means for winding said at least one spring motor using the reciprocating wave motion of a natural body of water;
c) an electrical generator having a power generation driveshaft;
d) transmission means for transferring stored energy that is in said at least one spring motor after having been properly wound, to said power generation driveshaft of said electricity generator to produce electrical current; and
e) said winding means comprising:
an elongated spring-motor primary winding axle having a front end, a rear end and said same longitudinally extending X-axis; a winding-drive spur gear is rigidly mounted on said spring-motor primary winding axle;
an elongated ratcheting arm having a front end, a rear end and a transversely extending longitudinal Y-axis; said rear end of said ratcheting arm being secured to a ratcheting arm mounting assembly that is journaled on said spring-motor primary winding axle; said ratchet arm mounting assembly having a winding-drive spur ratchet pawl that engages said winding-drive spur gear as it attempts to rotate in one direction and releases from said winding-drive spur gear as it rotates in an opposite direction.

16. A natural forces powered electricity generation system as recited in claim 15 wherein said system is a modular unit.

17. A natural forces powered electricity generation system as recited in claim 16 wherein said modular unit is mounted on a concrete pad.

18. A natural forces powered electricity generation system as recited in claim 15 further comprising a frame assembly and said spring motor, said winding means and said electricity generator are mounted on said frame assembly.

19. A natural forces powered electricity generation system as recited in claim 18 wherein said frame assembly is covered by a housing.

20. A natural forces powered electricity generation system as recited in claim 15 wherein said winding means further comprise first spring means connected to said ratchet arm mounting assembly to return bias said ratchet arm to a static position.

21. A natural forces powered electricity generation system as recited in claim 20 wherein said winding means further comprises an elongated tether member having a front end and a rear end; said rear end being connected to said ratcheting arm adjacent said front end.

22. A natural forces powered electricity generation system as recited in claim 21 wherein said winding means further comprises means on said front end of said tether member for connection to a buoy, floating on a body of water, that floating on a that is being moved from a static position by wave motion.

23. A natural forces powered electricity generation system as recited in claim 15 wherein there are a plurality of spring motors connected to said spring-motor secondary winding axle.

24. A natural forces powered electricity generation system as recited in claim 23 wherein said transmission comprises at least one flywheel.

25. A natural forces powered electricity generation system as recited in claim 23 wherein said spring motors are located in a spring motor housing.

26. A natural forces powered electricity generation system as recited in claim 15 wherein said winding means further comprises a one-way sprague coupling that is connected to said rear end of said spring-motor primary winding axle to allow said spring motors to be wound in a first direction; said one-way sprague coupling is also connected to said front end of said spring-motor secondary winding axle thereby allowing said spring-motor secondary winding axle to rotate freely in said first direction after said at least one spring motor has released said stored energy after having been properly wound.

27. A natural forces powered electricity generation system as recited in claim 15 further comprising counting means for keeping track of the number of times said at least one spring motor is wound a predetermined number of rotations.

28. A natural forces powered electricity generation system as recited in claim 27 further comprising unlatching means for releasing said at least one spring motor, after they have been wound a predetermined number of rotations, so that they can power said electricity generator.

\* \* \* \* \*